Patented Sept. 15, 1925.

1,554,184

UNITED STATES PATENT OFFICE.

MAJOR E. HOLMES AND GAIL J. FINK, OF WASHINGTON, DISTRICT OF COLUMBIA, ASSIGNORS TO NATIONAL LIME ASSOCIATION, OF WASHINGTON, DISTRICT OF COLUMBIA, A CORPORATION OF DISTRICT OF COLUMBIA.

PRODUCTION OF QUICK-SETTING LIME PRODUCTS BY THE ADDITION OF ZEOLITES.

No Drawing.   Application filed July 19, 1923.   Serial No. 652,647.

*To all whom it may concern:*

Be it known that we, MAJOR E. HOLMES and GAIL J. FINK, citizens of the United States, residing at Washington, in the District of Columbia, have invented certain new and useful Improvements in the Production of Quick-Setting Lime Products by the Addition of Zeolites, of which the following is a specification.

Our invention relates to the production of plastic materials which have quick initial setting properties and which are adapted to be used in the making of mortars, plasters, shaped articles such as blocks and the like.

The use of calcined gypsum for plastering purposes is well known. Gypsum sets so quickly that it is necessary to add varying proportions of a retarding agent to delay the set sufficiently to allow the workmen time to get the plaster on the wall. In addition to this objection, gypsum has a number of other serious objections and disadvantages. For example, the material is difficult to work, owing to its lack of plasticity and, as compared to lime, its low sand-carrying capacity. Large quantities of lime are used for plastering purposes but in using this material it is necessary to wait a considerable period of time—twenty to twenty-four hours—for each coat to acquire what may be termed its initial set, by which it becomes sufficiently strong, firm and dry so that the succeeding coat may be applied. This is quite a serious objection since it requires the removal of scaffolds from one room to another between the application of the various coats, if the workmen are not to suspend work entirely.

We have found that quick initial setting properties may be imparted to plastic materials such as lime and thereby the latter may be successfully used for plastering purposes and for the production of mortars, blocks and the like.

We have found that by mixing varying percentages of soluble silicates or materials engendering compounds of this type, preferably finely ground, the lime acquires quick setting properties. The silicate addition agent may be added in the dry form or in solution. Our investigations indicate, however, that it is preferable to add the silicate in the dry form either to dry hydrated lime or to a putty or mortar made from quicklime or hydrated lime. The silicates which readily dissolve and which therefore may be added in the dissolved form tend to cause an efflorescence or incrustation on the finished product. The addition of the silicates in the dissolved form is also unsatisfactory because of their tendency to react with the lime in a very short time and produce an initial quick set thereby making the working of the mortar rather difficult. We prefer therefore to add the silicates in the form of dry powders. The reaction between the lime and silicate is thus delayed until the plaster or mortar is in place, thereby producing the desired setting effect.

We have found that the various natural occurring silicates known under the mineralogical name of "zeolites" especially sodium and potassium, are admirably suited for our purposes. In place thereof the different synthetic silicates, on the market under varying trade-names may be used with equally satisfactory results.

The term "initial set" is used to indicate that condition of the lime plaster which makes it suitable for the application of the second or brown coat. It is not necessarily hard in this condition, but is firm, strong and rigid enough to support the weight of the second coat and withstand the pressure necessary in the application of the second coat. This is distinguished from the term "hardening" in that the latter refers to the condition of the mortar after it has undergone practically all the physical and chemical changes that it will undergo and has developed a strength near its maximum strength.

Ordinarily, lime mortar does not harden to the final condition of hardness for a great many months and in some cases a number of years, whereas the initial set occurs in about 22½ hours when using standard sanded lime mortar, and in our mortar, the initial set is so quickened as to occur in some cases in slightly over an hour. The term, "quick initial set" is used to distinguish between slow setting hydrated lime which acquires approximately 20 to 25 hours to acquire its initial set and our material which will set in less than one fourth of this time and in some cases in about an hour. We do not desire to set any definite limit as to the time it takes our material to acquire its initial set as this will depend on the character of the lime and the type and percentage of soluble silicate used.

We have used the standard Gillmore needle in testing for the set of lime mortar. We find that when the heavily weighted Gillmore needle penetrates to a distance of 2 mm. in the pat the mortar has assumed its set, that is it is in a condition to receive the second coat. This relation between the penetration of the needle and its suitability for the second coat, has been checked up by practical plasterers.

As a specific example, the following is given: A suitable plaster may be prepared by mixing 10% of a zeolite such as sodium aluminum silicate (No. 91-2) with a 1:3 lime mortar mix, that is, one part of hydrated lime and 3 parts of sand and adding the requisite amount of water. The percentage of zeolite is figured on the combined weight of the hydrated lime and sodium silicate. For example, 90 parts of hydrated lime will require 10 parts of sodium silicate. Such a plaster will set sufficiently in 3 hours and 35 minutes to permit the application of a second or brown coat. If the quantity of sodium silicate be increased to 20%, that is, the mix consists of 20 parts of zeolite, 90 parts hydrated lime and sufficient sand to form a 1:3 mortar mix, the resulting product on the addition of water, will set in 1 hour and 10 minutes. It may be desirable for certain purposes to retard the time of set and this may be accomplished by the addition of suitable retarders such as glue, casein, dried blood, ground tankage and the like.

The following table gives in tabular form the periods of set of a 1:3 lime mortar obtained in comparative tests with or without addition agents such as zeolites:

| Addition agent | Per cent added | Time of set |
|---|---|---|
| | | Hrs. min. |
| Hydrated lime alone | | 22  30 |
| Zeolite (No. 91-1) | 5 | 4  40 |
| Zeolite (No. 91-2) | 10 | 3  35 |
| Zeolite (No. 91-3) | 20 | 1  10 |
| Zeolite (No. 91-4) | 5 | 5  55 |
| Zeolite (No. 91-5) | 10 | 5  45 |
| Zeolite (No. 91-6) | 20 | 5  35 |

Zeolite 91-(1 to 3) is a synthetic product resembling natural zeolites used extensively for water softening and consists essentially of sodium aluminum silicate. It is upon the market in a fine granular condition under the trade-name of "Decalso."

Zeolite No. 91-(4 to 6) is also a synthetic product used for water softening. It is essentially sodium aluminum silicate and appears in the market under the trade-name of "Zeolite Water Softener" in the form of small porous granules, greenish gray in color, which are insoluble in water.

As stated, the materials forming the plaster mix are preferably mixed in a dry state and there is no reaction in the mixed constituents until after the water is added. Proceeding in this manner, the accelerating agent, lime and other ingredients may be mixed at the place of manufacture and thereby a prepared dry plaster mix sent to the trade which requires only the addition of water and sand to be immediately available for use. It is to be understood, however, that we do not desire to be limited to this particular method of preparation.

The method of using the prepared plaster is as follows: The plaster is mixed with the necessary amount of sand which is usually 1:2 or 1:3 for the scratch coat and from 1:4 to 1:6 for the brown coat. If the plaster is to be applied to an absorptive backing such as wood lath, brick or building blocks, the backing is first thoroughly moistened. The first or scratch coat is then applied and after it has set sufficiently it is scratched thoroughly. As soon as the scratch coat has set up to such an extent that the keys will not be disturbed by application of a second coat, the brown coat may be applied. For the application of the brown coat it is not necessary that the scratch coat be dry. It is sufficient if the latter has hardened enough to carry the weight of the brown coat. In using quick setting plasters the brown coat may be floated usually within half an hour or an hour, and in certain cases, in a much shorter time. This is a great advantage over the use of ordinary lime plasters since the latter cannot be floated for a considerably longer period of time. The brown coat may be then white-coated as soon as it becomes rigid. It is not necessary for it to be completely dry. In many of our practical tests a finish or white coat has been applied within two hours after the scratch coat was applied. It is obvious that considerable time is saved by the use of our quick setting plasters.

Quick initial setting plastic materials produced according to our invention have excellent tensile strength. In certain cases where it is desired to increase the strength of the finished product, small quantities of calcined gypsum, Portland-cement or the like may be added to the lime and silicate mix without greatly influencing the effect of the accelerating action of the silicates. Again, it may be desirable to make very dense products which may be accomplished by taking advantage of the shrinkage resulting from the addition of lead compounds. Deefflorescing agents such as lead acetate, lead oxide, zinc oxide or hydroxide, antimony oxides, glue and the like may be added, if necessary.

The term, "hydrated lime" as used in the specification and claims includes the various kinds of commercial hydrated lime which may vary considerably in its composition. It is intended to include thereunder both calcium and dolomitic hydrated lime. In addition, we intend to cover by this term dry hydrated lime which is a definite article of commerce or lime putty which may be made from dry hydrated lime or from quick lime.

It is obvious that hair, asbestos or similar materials may be added to the silicate mix.

We claim:

1. A plastic material having quick initial setting properties comprising hydrated lime and a zeolite.

2. A plaster mix having quick initial setting properties comprising hydrated lime and a zeolite.

3. The process of treating hydrated lime to confer thereupon quick initial setting properties comprising adding thereto a zeolite, adding the necessary amount of water and allowing the resulting product to set.

4. The process of treating hydrated lime to confer thereupon quick initial setting properties comprising adding to the hydrated lime in a dry state a dry zeolite.

5. The process of making a plastering material having quick initial setting properties comprising mixing hydrated lime with a zeolite.

6. The process of making a plastering material having quick initial setting properties comprising mixing dry hydrated lime with a dry zeolite.

In testimony whereof we hereunto affix our signatures.

MAJOR E. HOLMES.
GAIL J. FINK.